(12) United States Patent
Velizhev et al.

(10) Patent No.: US 11,443,242 B2
(45) Date of Patent: Sep. 13, 2022

(54) ITERATIVE TRAINING OF A MACHINE LEARNING MODEL

(71) Applicant: International Business Machines Corporation, Armonk, NY (US)

(72) Inventors: Alexander Velizhev, Oberrieden (CH); Martin Rufli, Winterthur (CH); Ralf Kaestner, Othmarsingen (CH)

(73) Assignee: International Business Machines Corporation, Armonk, NY (US)

(*) Notice: Subject to any disclaimer, the term of this patent is extended or adjusted under 35 U.S.C. 154(b) by 330 days.

(21) Appl. No.: 16/853,924

(22) Filed: Apr. 21, 2020

(65) Prior Publication Data

US 2021/0326749 A1    Oct. 21, 2021

(51) Int. Cl.
*G06N 20/00* (2019.01)
(52) U.S. Cl.
CPC .................................. *G06N 20/00* (2019.01)
(58) Field of Classification Search
CPC . G06N 3/08; G06N 20/20; G06T 3/60; G06K 9/6227
See application file for complete search history.

(56) References Cited

U.S. PATENT DOCUMENTS

| | | | |
|---|---|---|---|
| 9,158,839 B2 | 10/2015 | Hudek | |
| 9,390,112 B1 | 7/2016 | Daly | |
| 9,609,011 B2 | 3/2017 | Muddu | |
| 10,318,882 B2 | 6/2019 | Brueckner | |
| 11,087,173 B2* | 8/2021 | Hou | G06T 3/60 |
| 2014/0058983 A1 | 2/2014 | Hudek | |
| 2016/0078361 A1 | 3/2016 | Brueckner | |
| 2018/0018579 A1* | 1/2018 | Xu | G06N 20/00 |
| 2019/0155952 A1 | 5/2019 | Tang | |
| 2019/0311614 A1* | 10/2019 | Yang | G05D 1/0246 |
| 2019/0378044 A1 | 12/2019 | Jeffery | |

FOREIGN PATENT DOCUMENTS

| | | |
|---|---|---|
| CN | 104317894 B | 12/2018 |
| WO | 2021214558 A1 | 10/2021 |

OTHER PUBLICATIONS

Patent Cooperation Treaty PCT International Search Report and Written Opinion of the International Searching Authority, May 17, 2021, International Application No. PCT/IB2021/051060, International Filing Date Feb. 10, 2021, 6 pages.

(Continued)

*Primary Examiner* — Olugbenga O Idowu
(74) *Attorney, Agent, or Firm* — Gilbert Harmon, Jr.

(57) ABSTRACT

A computer-implemented method, computer program product, and computer system are provided. The method comprises training a machine-learning model using an initial set of training data samples, receiving a new training data sample, and predicting a label for the new training data sample. The method also comprises, upon determining that a prediction quality value for the predicted label of the new training data sample is below a predefined quality value, adding the new training data sample to the initial set, thereby building an extended training data set. The method also comprises retraining the machine-learning model using the extended training data set.

14 Claims, 4 Drawing Sheets

(56) References Cited

OTHER PUBLICATIONS

"Iterative Training of a Machine Learning Model", PCT Application No. IB2021/051060, filed on Oct. 2, 2021, 34 pages.

"Data Sets for Machine Learning Model Training", Edge AI & Vision Alliance, Feb. 28, 2018, 38 pages, https://www.edge-ai-vision.com/2018/02/data-sets-for-machine-learning-model-training/>.

Berthelot et al., "MixMatch: A Holisitic Approach to Semi-Supervised Learning", arXiv:1905.02249v2 [cs.LG] Oct. 23, 2019, 33rd Conference on Neural Information Processing Systems (NeurIPS 2019), Oct. 23, 2019, 14 pages, <https://arxiv.org/pdf/1905.02249.pdf>.

Roh et al., "A Survey on Data Collection for Machine Learning", arXiv:1811.03402v2 [cs.LG], Aug. 12, 2019, 20 pages, <https://arxiv.org/pdf/1811.03402.pdf>.

Yoo et al., "Learning Loss for Active Learning", arXiv:1905.03677v1 [cs.CV], May 9, 2019, 10 pages, <https://arxiv.org/pdf/1905.03677.pdf>.

\* cited by examiner

ITERATIVE TRAINING OF A MACHINE LEARNING MODEL

BACKGROUND

The present invention relates generally to the field of machine learning, and more particularly to the iterative training of a machine learning model.

Artificial intelligence (AI) and the subfield of machine-learning (ML) are growing fields in science as well as in enterprise computing. New algorithms are constantly being designed in order to achieve better predictions by machine-learning systems and/or improve the training of the underlying machine-learning models.

Traditional machine-learning methods are typically based on machine-learning algorithms using a fixed set of training data samples together with respective annotations in order to build a general model capable of predicting annotations of so far unseen new data samples.

For example, a deep learning model for image classification is trained on a known set of input images and associated image class labels. Later, during a testing phase, as well as during a production phase, this model is used to predict image class labels for new, previously unseen images. Of course, instead of images other data types may also be used as input to machine-learning systems.

Input data samples may be produced by data generators. These can include real-world sensors, e.g., photo and/or video cameras, microphones, or any other sensors, human beings, e.g., text writers, or data simulators. Data generators can also include artificial systems aiming to produce certain predefined types of data samples. Typically, a traditional data recognition method operates with a fixed definitive number of training data samples which form a training set of data samples.

U.S. Patent Application Publication 2014/0058983 A1 discloses a mechanism for training and classifying data. The method includes receiving a data set having at least a first annotation and at least a second annotation. The first annotation and the second annotation represent characteristics within the data set. The method also includes a determination of a first identifier from the first annotation and a second identifier from the second annotation and associating the first identifier to the second identifier to generate a joint identifier.

U.S. Patent Application Publication US 2016/0078361 A1 discloses obtaining an indication of a data service to be used to train a linear prediction model. The model is to generate predictions using respective parameters assigned to a plurality of features derived from observation records of the data source.

However, there continues to be a need for a better continuous learning mechanism in addressing the availability of annotated and non-annotated new training data.

SUMMARY

According to one aspect of the present invention, a computer-implemented method, a computer program product, and a computer system are provided. While the following paragraphs will discuss specific features of the computer-implemented method, the discussed features can also generally be applied to the computer program product and the computer system. The method may comprise training a machine-learning model using an initial set of training data samples, receiving a new training data sample, and predicting a label for the new training data sample. The method may also comprise, upon determining that a prediction quality value for the predicted label of the new training data sample is below a predefined quality value, adding the new training data sample to the initial set, thereby building an extended training data set, and retraining the machine-learning model using the extended training data set. The method may also comprise iteratively repeating the receiving, the predicting, the adding, and the retraining until a stop condition is met.

The proposed computer-implemented method may offer multiple advantages, technical effects, contributions and/or improvements:

The method may allow for the training or pre-training of a machine-learning system without a large number of annotated training data samples. In some cases, no notation may be required at all. The system may receive continuously—during a training phase—real life data (e.g., from cameras) which may be non-annotated to improve an overall prediction quality of the system and the method. This may allow for the reducing of manual manipulation of the training data—e.g., manual adding of labels and/or annotations—significantly. This may speed up the training process of a neural network and/or other machine-learning systems.

In particular, the feature of selecting new training data samples showing low quality prediction values may be used to increase the prediction quality of the overall machine-learning system. This may be achieved by trying to reconfirm a class which has been predicted under artificially changed conditions, i.e., manipulations performed to the received new training data sample. In doing so, a combined prediction quality value (from the different prediction cycles for the same new training data sample) may be generated in order to reconfirm and increase the originally low prediction quality value.

The method may be used advantageously for documents comprising text and graphics (e.g., pdf {portable document format} document or otherwise scanned documents in pixel format) in order to achieve a better interpretability of the graphics or diagrams (e.g., plots, bar charts, x-y-curves, etc.) in the documents. The documents may include scientific documents, construction documents, maintenance documents, patent documents, and the like.

The method may also be used advantageously for training machine learning models using a computer graphics simulator (e.g., for computer games) in order to achieve better object detection, object segmentation, or object instance segmentation results.

According to one useful embodiment of the method, the stop condition may be met if a predefined training time value is reached, if a predefined number of training cycles has been performed, if a predefined number of new training data samples have been processed, or if a predefined summary prediction quality condition is met. Thus, the continuous or iterative learning process may be stopped or at least interrupted if very few prediction results with low prediction quality—i.e., below a predefined threshold value—are produced. If no stop conditions are defined or none of the above-defined conditions are met, the continuous or iterative learning process may run unlimited. Thereby, the prediction quality may be increased continuously.

Furthermore, the stop condition may also be met if in a predefined time no additional new training data sample with a prediction quality value below the predefined quality is determined. The predefined time may, e.g., be an hour, a day, predefined activity hours of the day, a week, or any other suitable time period.

According to a further advantageous embodiment, the method may also comprise, upon determining that the prediction quality value for the predicted label of the new training data sample is below the predefined quality value, reconfirming the predicted label of the new training data sample by applying a self-supervised learning method to the new training data sample. This self-supervised learning method may comprise a manipulation of the received data sample (e.g., image), such as rotating it (by a predefined angle or series of angles), flipping it (e.g., horizontally, vertically, diagonally or along any other line) or puzzling and reshuffling it. After such manipulation, the prediction process may be repeated and if the same class as in the first instance is predicted, the annotation is reconfirmed. In general, the new data sample shall produce the same low quality data (or better) again and again under different conditions. Thereby, an objective is to improve the confidence by building a combined prediction quality value (e.g., average or weighted average) which increases over a sequence of sample data manipulations. It should also be noted that this procedure is not required if annotated sample data are available.

The self-supervised learning method may comprise at least one selected out of the group consisting of: rotating the received new training data sample by a predefined rotation angle and predicting the rotation angle—thereby, the predefined rotation angle may be used as annotation—flipping the received new training data sample by a predefined flipping angle and predicting the flipping angle (also, other possible non-flip-angles), re-colorizing the received new training data sample and predicting a class of the resulting re-colorized training data, and/or puzzling the received new training data sample and predicting an original position of a tile of the new training data sample. For a re-colorization, parameters of one or more color channels may be blocked or otherwise changed (e.g., reduced or increased color intensity).

According to another optional embodiment, the method may also comprise: upon determining that a prediction quality of a received new training data sample cannot be improved—i.e., the combined confidence level value does not get better anymore—triggering an alarm event. This may be used for triggering a supervised learning process involving manual annotation by a human annotator.

BRIEF DESCRIPTION OF THE DRAWINGS

It should be noted that embodiments of the invention are described with reference to different subject-matter. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present invention, are apparent from the examples of embodiments to be described hereinafter and are explained with reference to the examples of embodiments, but to which the invention is not limited.

Figure 1:
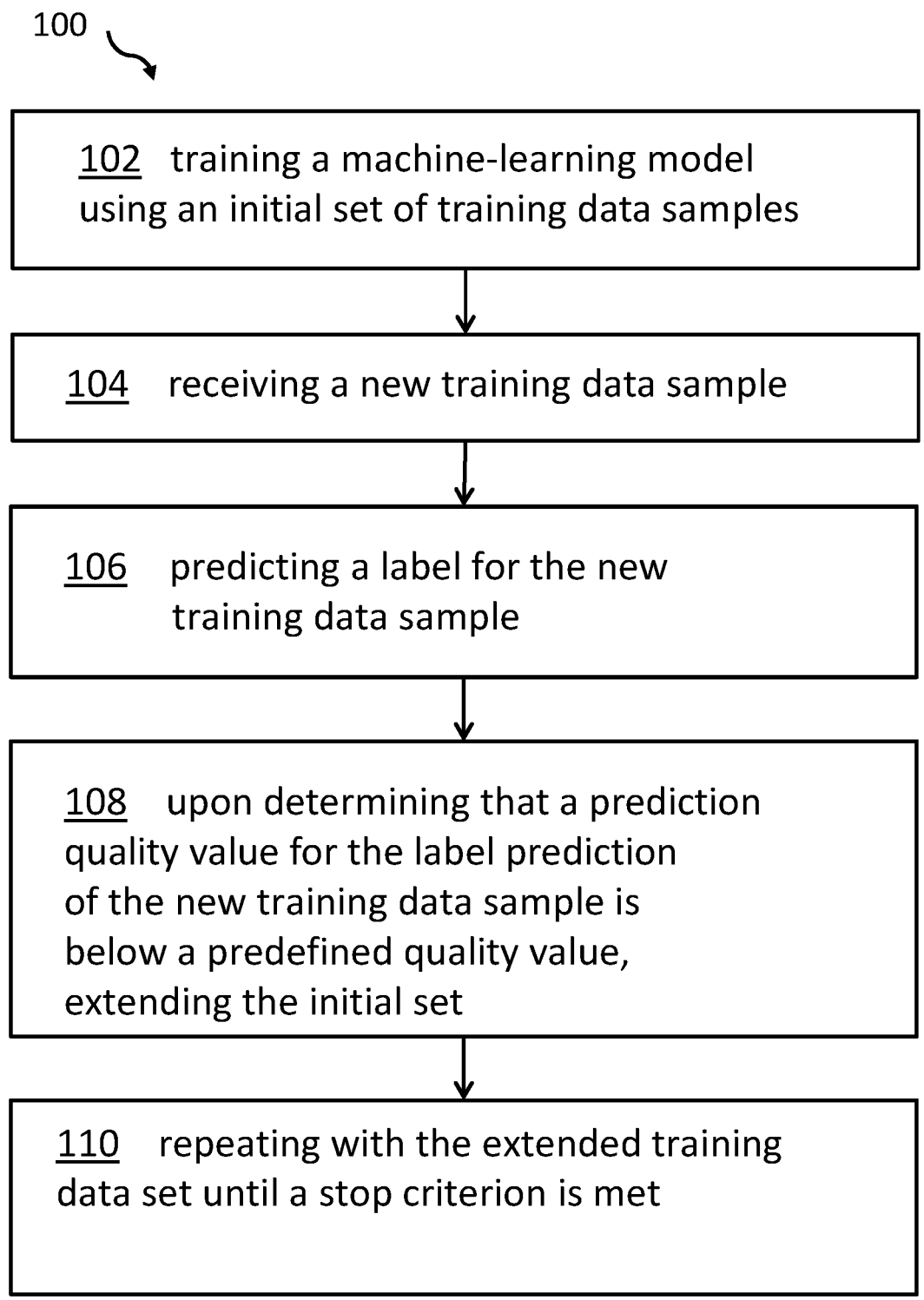
Figure 2:
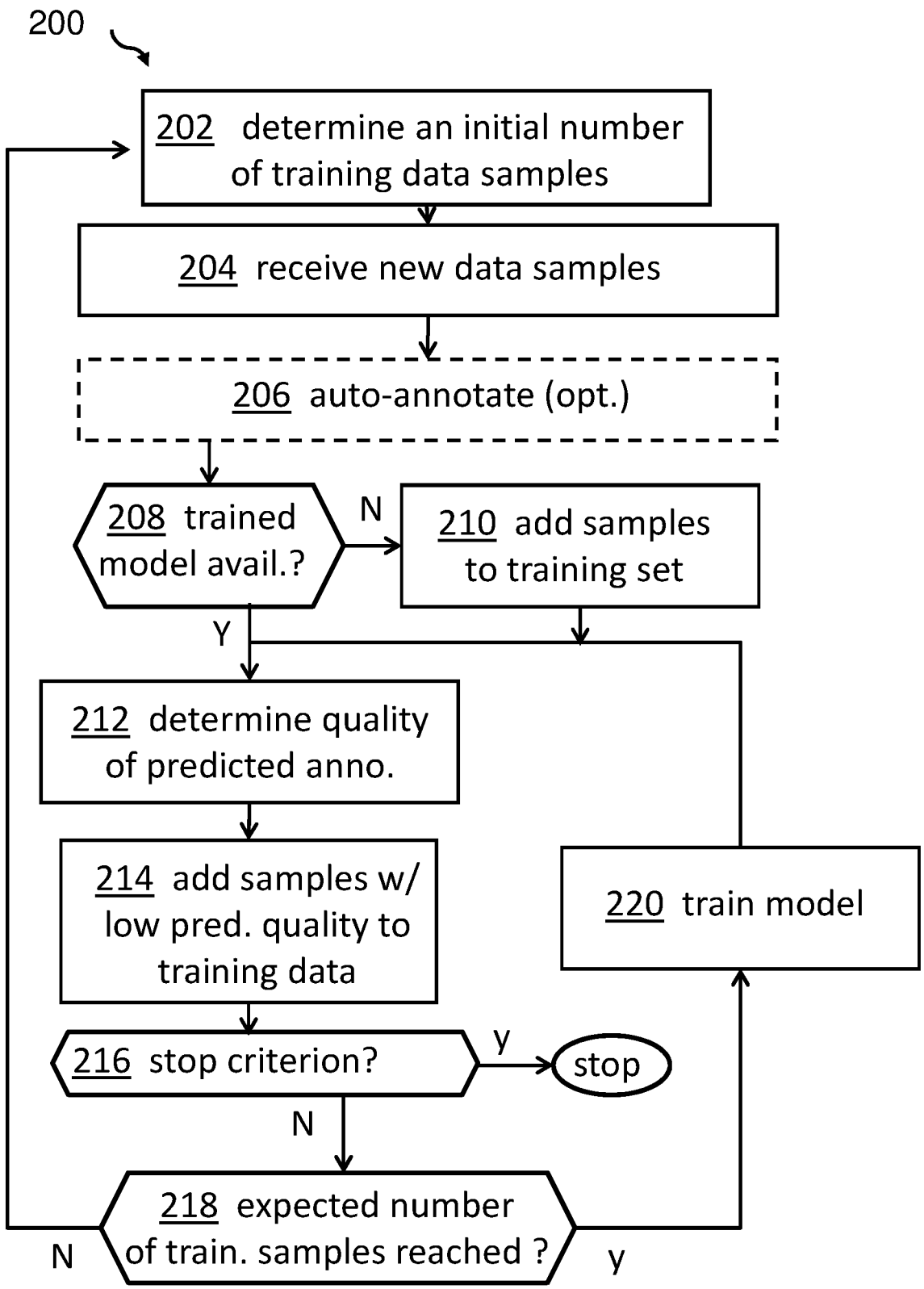
Figure 3:
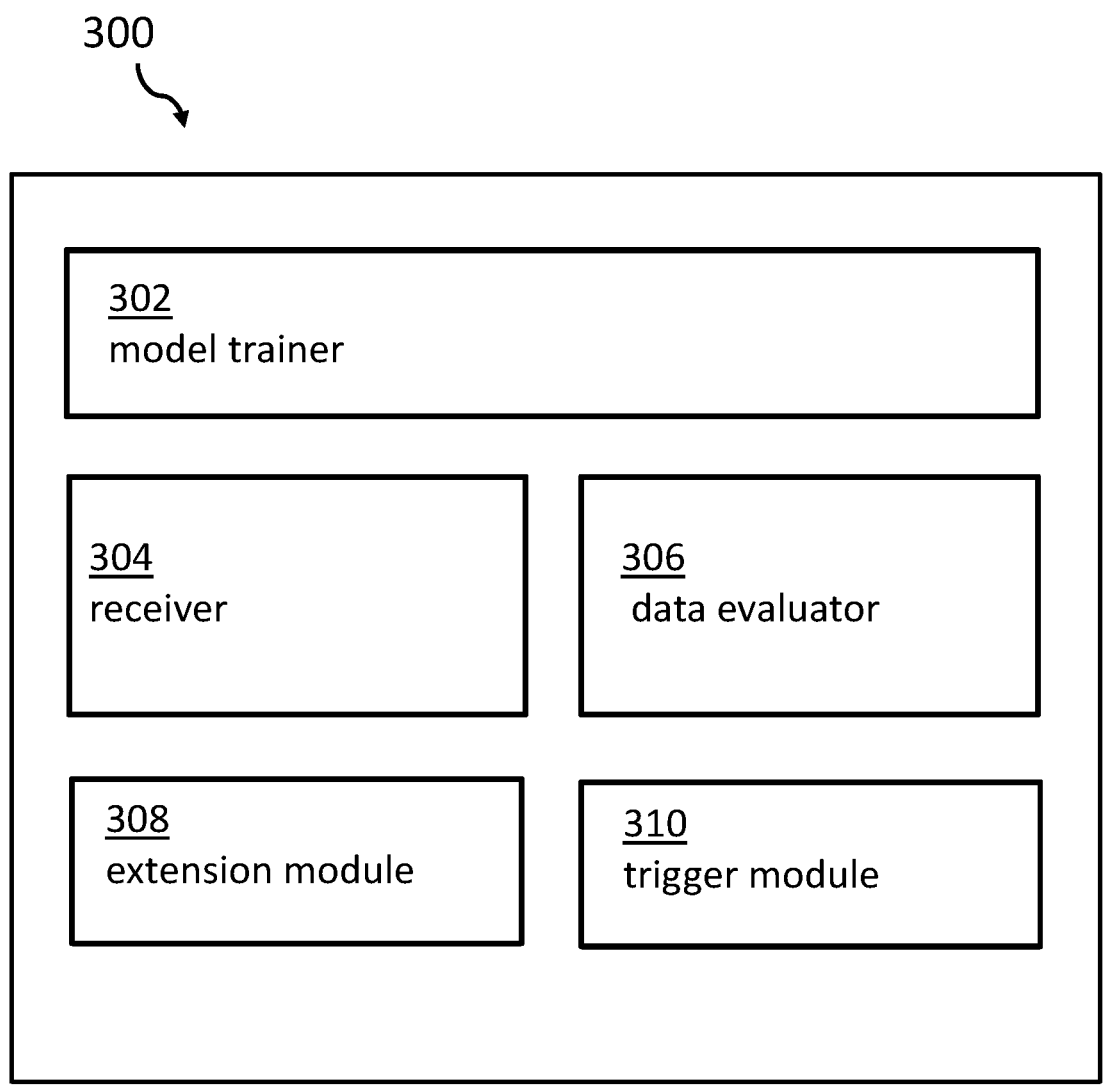
Figure 4:
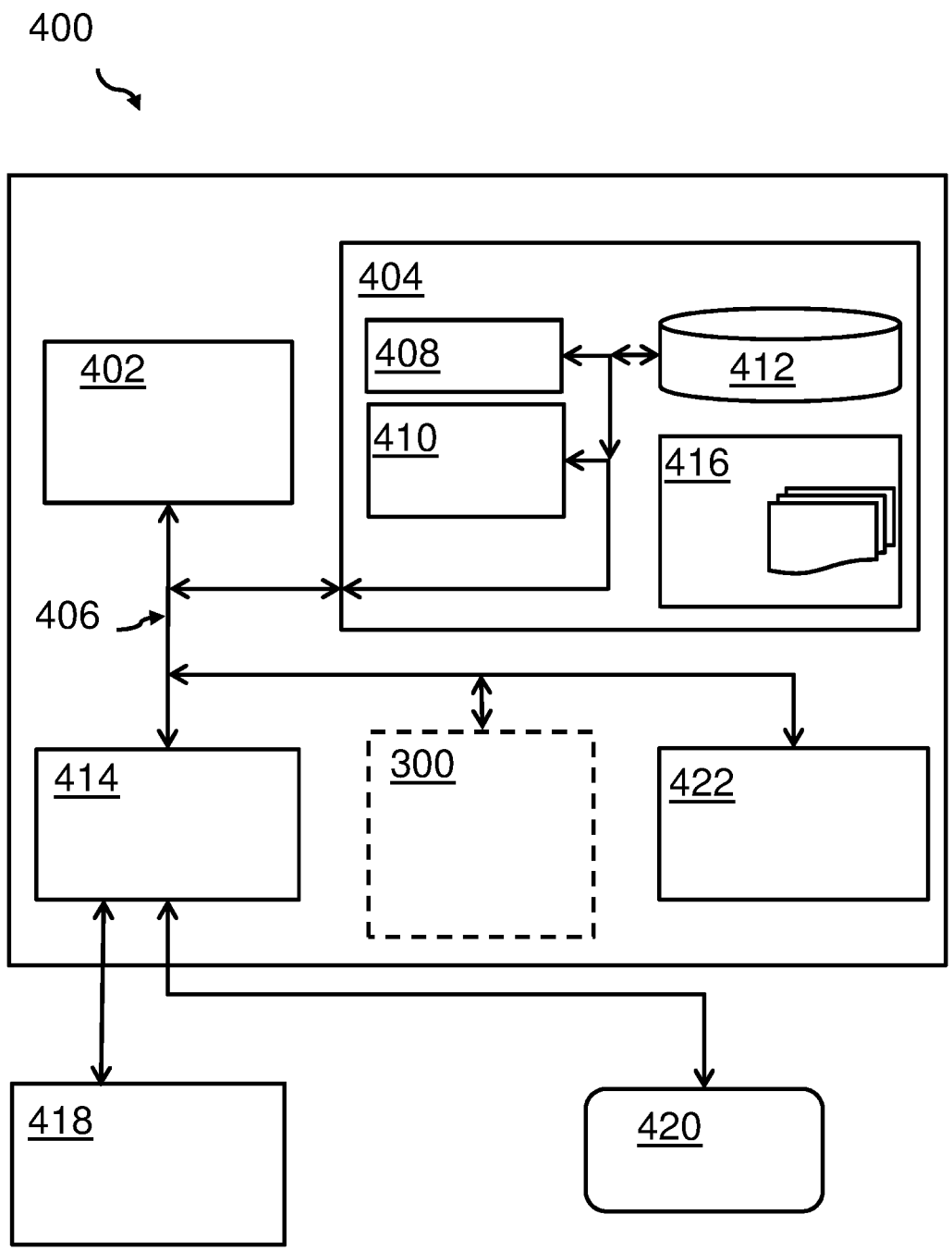

Preferred embodiments of the invention will be described, by way of example only, and with reference to the following drawings:

FIG. 1 is a flowchart showing a method for training a machine-learning model, according to an embodiment of the present invention;

FIG. 2 is a flowchart showing another method for training a machine-learning model, according to an embodiment of the present invention;

FIG. 3 is a block diagram view of a machine-learning model training system, according to an embodiment of the present invention; and FIG. 4 is a block diagram view of a computing system 400 suitable for executing program code related to methods of the present invention.

DETAILED DESCRIPTION

In the context of this description, the following conventions, terms and/or expressions may be used:

The term 'and/or' denotes an inclusive or; for example, A, B, "and/or" C means that at least one of A or B or C is true and applicable.

The term 'machine-learning model' may denote the process of building a model which may be used for machine-learning. Machine-learning should here be understood as the scientific study of algorithms and the specific models that computer systems may use to perform a specific task without using explicit instructions, i.e., without procedural programming. Machine-learning is a subcategory of artificial intelligence. Typically, a model is trained with a set of known and labeled data samples in order to, e.g., classify or otherwise categorize unknown data samples into the trained classes. Examples of underlying technologies for ML learning models are artificial neural networks, random-forest systems and/or decision trees. The systems may be used for classification tasks or regression tasks. In embodiments of the present invention, the requirement for annotated data samples for a training and development of the ML model is significantly reduced.

The term 'initial set of training data samples' may denote a number of data samples to be used for a first training of the machine-learning model. This initial set may comprise annotated or non-annotated samples. It should be noted that typically, the initial set of training data samples may be annotated. However, there are also cases in which completely non-annotated data sets may be used as initial set of training data samples. In any case, it is very useful to have at least a minimized set of annotated data samples in order to define the underlying classes for the prediction.

The term 'new training data sample' may denote a data sample, e.g., an image that has not been used for a training of the machine-learning model before.

The term 'predicting' may denote the activity of a machine learning model. The prediction value of the predicted class—in particular, part of a predefined number of prediction classes—may be generated for new, so far unseen, data samples based on an underlying trained machine-learning model (e.g., a classifier model). In the case of using a machine-learning model for better interpretability of text document with graphics and images, the output prediction may also be represented as a set of bounding boxes (e.g., at least one), a segmentation mask, a set of keypoints/landmarks or other high level semantic representation in the graphics and/or images embodied in the text, which may be available in pixel information only (e.g., in PDF).

The term 'stop criterion' may denote a condition under which a method or process flow comes to an end.

The term 'sample data generator' may denote either an artificial data generator such as a computer graphic simulator, a camera, or a microphone, or any other data generating sensor.

The term 'real world sensor' may denote any signal generating device delivering data from real word scenes. Such devices may be cameras for still images or those for generating continuous data streams (e.g., video cameras), microphones for sound or voice data, news feeds or other sources of written information (e.g., including diagrams and other images), chemical analytics systems, and the like.

The term 'summary prediction quality criterion' may denote a numerical value expressing prediction values for a label and/or annotation for the same data sample using variations of the data sample. Thus, an input sample may be used as input to predict a class; then the input sample may be manipulated in a predefined way(s)—e.g., an image may be rotated or flipped, etc.—and the prediction may be repeated. This may produce a different summary prediction quality value for the same predicted class. Several such predictions may be combined—e.g., building an average prediction quality value or a weighted average prediction quality value—in order to build a summary prediction quality criterion or summary prediction quality value (also referred to as the "combined confidence level value").

The term 're-colorizing' may denote a process of changing the color scheme for a given image. For one or more of the color channels of the image the intensity of a specific color of the underlying color model may be increased or decreased. Typically, one or more of the color channels may be set to zero intensity. This process is also known as false color rendering or false color representation.

Additionally, for re-colorizing, one may train the machine learning model in a way to predict one image color channel given one or more other image channels. For example, one may have an RBG image consisting from three color channels (red, blue and green). One can use only two channel-images as an input to the ML model, and the model may predict the remaining color channel and a prediction error may be determined by comparing the predicted channel and the original channel. This technique may help to train the ML model using unlabeled data because no annotations are needed for this task. Thus, this technique can be considered similar to "puzzling".

The term 'puzzling' may denote the process of cutting an image into pieces or tiles (regular cuts or irregular asymmetrical cuts) and reshuffling the pieces. Then, the machine learning system may predict the class again. As an example, an image may be cut into 9 pieces and, e.g., the top left snippet may be exchanged with the bottom middle snippet, the top left snippet may be exchanged with the middle left snippet, and so on.

The term 'deep machine-learning system' may denote, e.g., a neural network with a plurality of layers which may be fully or only partially connected. In order to qualify for a deep machine-learning system the number of layers (including the input and the output layer) should be far above 3. Typical deep machine-learning systems may comprise 10 or 50 layers (or even 200 or more). The layers may be convolutional and pooling layers which may be organized in certain groups.

The term 'hyper-parameter' may denote a set of parameters describing the architecture of a machine-learning model, e.g., the number of layers in an artificial neural network, the kind of layers that are used, the length of the input data vector, the number of classes for the prediction, the type of connections between the layers (fully or partially connected) and an operative mode of the machine-learning system.

Another important parameter is a learning rate. The learning rate defines a scale factor for the residual vector during back propagation inside a neural network. This parameter is very critical and fine tuning is required. Often there is a special "schedule" which defines how the learning rate is changing during training.

In the following, a detailed description of the figures will be provided. All instructions in the figures are schematic. Firstly, a flowchart showing a computer-implemented method for iterative training of a machine-learning model is provided. Afterwards, further embodiments, as well as embodiments of a machine-learning model training system, will be described.

FIG. 1 is a flowchart showing a method 100 for training a machine-learning model, according to an embodiment of the present invention. The method comprises training, 102, a machine-learning model which is defined by a set of hyper-parameters. Thereby, an initial set of training data samples is used. Typically, at least a few annotated data samples are needed to start the training in order to define some classes. However, there may be other cases in which one may work with only non-annotated data.

The method 100 comprises receiving, 104, a new training data sample, and predicting, 106, a label or annotation for the new training data sample. These at least one new training data samples can be annotated or non-annotated. However, embodiments may be more effective for the non-annotated new data samples because for already annotated training data samples, other training procedures may be suitable. However, it should be noted that in some embodiments, the method 100 can be functional for a mixture of annotated and non-annotated new training data samples.

The new training data samples may be collected during a normal operation of the machine-learning system without the initial attempt to use them as new training data. They may become training data depending on the predictive behavior of the underlying machine-learning system, e.g., for those received samples that provoke a prediction with low prediction quality marks.

On the other hand, in some embodiments, the received new training data may be dedicated for an initial training procedure, and the received data samples may not be a result of a usage of the machine-learning system.

The method 100 also comprises, upon determining that a prediction quality value for the label prediction of the new training data sample is below a predefined quality value, extending, 108, the initial set of training data samples, thereby building an extended training data set. The method 100 also comprises repeating, 110, with the extended training set, the training, the receiving, the predicting, and the extending until a stop criterion is met, thereby iteratively, i.e., continuously, training the machine-learning model.

FIG. 2 is a flowchart showing another method 200 for training a machine-learning model, according to an embodiment of the present invention. As a first step, an initial number of training data samples is determined, 202. Next, a new data sample or training data sample is received, 204. These data samples are typically generated by an artificial or a real-world data generator (not shown). Optionally (shown as dotted box in the flowchart), an auto-annotation process may happen, 206.

If it is determined, 208, that a trained model is not yet available—case "N"—all received samples are added, 210, to the training data set. If a trained model is already available—case "Y"—a data evaluator estimates, determines or predicts, 212, the quality of the predicted annotation for the newly received training data sample and adds, 214, a new training data sample having a low prediction quality value to the training data set.

Then, it is determined, 216, whether a stop criterion is met. If this is the case—case "Y"—the training process stops ("stop"). If the stop criterion is not met—case "N"—it is determined, 218, whether an expected number of new training data samples is reached. If that is the case—case "Y"—the model is trained, 220, with the new training data samples and the automatically generated (predicted) annotations. After this, the process loops to the beginning or back to the step of determining whether there are other newly received training data samples having a low prediction quality (i.e., below a predefined prediction quality value).

Several modules may support the here described process: a data generator may be capable of producing new annotated data samples. In a general form, a data generator produces a continuous stream of data samples, annotated or not. One implementation form may be a computer graphics simulator. In this case, the stream of annotated data samples is generated by the computer graphics simulator. This simulator might use an open set of virtual environments or virtual worlds. The data generator has access to virtual instances and their properties in this simulated environment and is able to generate data samples in a form of color images, image masks, depth images, point clouds, normal maps and other representations which are valid for the simulator.

On the other hand, in some embodiments, the data generator can be a real-world sensor such as a security camera with the optional ability to generate annotations. Hence, the data stream generator may be considered as a black box system which allows requesting new data samples with optional data annotations.

Secondly, a model trainer can be considered as a machine-learning system which takes as input a set of data samples with or without annotations and which generates a model which is capable to predict annotations for new data samples. For example, the model trainer may be represented as a deep machine-learning system which takes data samples, (optionally) annotations, and a set of hyper-parameters which define a way to train the model.

As one block or module a "data evaluator" is enabled to take data samples, ground truth data annotations (optionally), and a trained model as input to produce expected annotations as output. The data evaluator is also enabled to estimate (predict or determine) a quality of the predicted annotation(s). This quality estimation may be determined by a comparison of predicted annotations with the ground truth. Another way to estimate quality of the prediction is a score of the prediction estimated by the model itself.

FIG. 3 is a block diagram view of a machine-learning model training system 300, according to an embodiment of the present invention. The system 300 comprises training means—e.g., a model trainer 302—e.g., for training of a machine-learning model using an initial set of training data samples. It may also comprise receiving means—in particular, a receiver 304—for receiving a new training data sample of a plurality of new training data samples.

The system 300 also comprises prediction means—e.g., in the form of a data evaluator 306—for predicting a label for the new training data sample. It may also comprise extension means—in particular an extension module 308—which is/are activatable upon a positive result of determining means for determining that a prediction quality value for the label prediction of the new training data sample is below a predefined (prediction) quality value, for extending the initial set, thereby building an extended training data set.

The system 300 also comprises trigger means—in particular a trigger module 310—adapted for triggering the training means using the extended training data set, the receiving means, the prediction means, and the determining means until a stop criterion is met, thereby iteratively providing a continuous training of the machine-learning model.

Embodiments of the invention may be implemented together with virtually any type of computer, regardless of the platform being suitable for storing and/or executing program code. FIG. 4 is a block diagram view of a computing system 400 suitable for executing program code related to the proposed methods.

The computing system 400 is only one example of a suitable computer system, and is not intended to suggest any limitation as to the scope of use or functionality of embodiments of the invention described herein, regardless whether the computing system 400 is capable of being implemented and/or performing any of the functionality set forth hereinabove. In the computing system 400, there are components, which are operational with numerous other general purpose or special purpose computing system environments or configurations. Examples of well-known computing systems, environments, and/or configurations that may be suitable for use with computing system 400 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computing system 400 may be described in the general context of computer system-executable instructions, such as program modules, being executed by computing system 400. Generally, program modules may include routines, programs, objects, components, logic, data structures, and so on that perform particular tasks or implement particular abstract data types. Computing system 400 may be practiced in distributed cloud computing environments where tasks are performed by remote processing devices that are linked through a communications network. In a distributed cloud computing environment, program modules may be located in both local and remote computer system storage media, including memory storage devices.

As shown in FIG. 4, computing system 400 is shown in the form of a general-purpose computing device. The components of computing system 400 may include, but are not limited to, one or more processors or processing units 402, a system memory 404, and a bus 406 that couple various system components including system memory 404 to the processing units 402. Bus 406 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 400 typically includes a variety of computer system readable media. Such media may be any available media that is accessible by computer system/server 400, and it includes both, volatile and non-volatile media, removable and non-removable media.

The system memory 404 may include computer system readable media in the form of volatile memory, such as random access memory (RAM) 408 and/or cache memory 410. Computing system 400 may further include other removable/non-removable, volatile/non-volatile computer system storage media. By way of example only, a storage system 412 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 406 by one or more data media interfaces. As will be further depicted and described below, memory 404 may include at least one program product having a set (e.g., at least one) of program modules that are configured to carry out the functions of embodiments of the invention.

The program/utility, having a set (at least one) of program modules 416, may be stored in memory 404 by way of example, and not limiting, as well as an operating system, one or more application programs, other program modules, and program data. Each of the operating systems, one or more application programs, other program modules, and program data or some combination thereof, may include an implementation of a networking environment. Program modules 416 generally carry out the functions and/or methodologies of embodiments of the invention, as described herein.

The computing system 400 may also communicate with one or more external devices 418 such as a keyboard, a pointing device, a display 420, etc.; one or more devices that enable a user to interact with computing system 400; and/or any devices (e.g., network card, modem, etc.) that enable computing system 400 to communicate with one or more other computing devices. Such communication can occur via Input/Output (I/O) interfaces 414. Still yet, computing system 400 may communicate with one or more networks such as a local area network (LAN), a general wide area network (WAN), and/or a public network (e.g., the Internet) via network adapter 422. As depicted, network adapter 422 may communicate with the other components of the computing system 400 via bus 406. It should be understood that, although not shown, other hardware and/or software components could be used in conjunction with computing system 400. Examples, include, but are not limited to: microcode, device drivers, redundant processing units, external disk drive arrays, RAID systems, tape drives, and data archival storage systems, etc.

Additionally, the machine-learning model training system 300 may be attached to the bus system 406.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

Some embodiment of the present invention provide a computer-implemented method for an iterative training of a machine-learning model, the method comprising: training of a machine-learning model using an initial set of training data samples, receiving a new training data sample, predicting a label for the new training data sample, upon determining that a prediction quality value for the label prediction of the new training data sample is below a predefined quality value, extending the initial set, thereby building an extended training data set, and repeating the training with the extended training data set, the receiving, the predicting and the extending until a stop criterion is met, thereby iteratively train the machine-learning model.

In some embodiments, receiving the new training data sample comprises receiving the new training data sample from a sample data generator or from a real world sensor.

In some embodiments, the stop criterion is met if a predefined training time value is reached, or if a predefined number of training cycles has been performed, or if a predefined number of new training data samples have been processed, or if a predefined summary prediction quality criterion is met, or if in a predefined time no additional new training data sample with a prediction quality value below the predefined quality value has been determined.

In some embodiments, the method further comprises: upon determining that the prediction quality value of a new non-annotated training data sample is below the predefined quality value, reconfirming the related prediction label by applying a self-supervised learning method to the new training data sample for increasing a combined confidence level value for the label which prediction quality value is below the predefined quality value.

In some embodiments, the self-supervised learning method comprises at least one selected out of the group comprising: rotating the received new training data sample by a predefined angle and predict the rotation angle, flipping the received new training data sample by a predefined angle and predict the rotation angle, re-colorizing the received new training data sample and predict the class of the new, re-colorized training data sample, and puzzling the received new training data sample and predict the original position of a tile.

In some embodiments, the step of repeating is only triggered if the extended training data set has been grown by a predefined number or a predefined percentage of new training data samples.

In some embodiments, the machine-learning model uses a deep machine-learning system.

In some embodiments, the method further comprises, upon determining that a prediction quality of received new training data sample cannot be improved, triggering an alarm event.

In some embodiments, in the case where two substantially equivalent real world sensors are used having a distance to each other and generating related data samples under different angles from a real world object, the method further comprises using the related data samples for adapting the machine-learning model in a way that for both related data samples identical prediction results and identical prediction quality values are generated.

In some embodiments, the initial set of training data samples comprises annotated samples.

Some embodiments of the present invention provide a system for iterative training of a machine-learning model, the system comprising: training means for training of a machine-learning model using an initial set of training data samples, receiving means for receiving a new training data sample, prediction means for predicting a label for the new training data sample, extension means which are activatable upon a positive result of determining means for determining that a prediction quality value for the label prediction of the new training data sample is below a predefined quality value, for extending the initial set, thereby building an extended training data set, and trigger means adapted for triggering the training means using the extended training data set, the receiving means, the prediction means and the determining means until a stop criterion is met, thereby iteratively provide a continuous training of the machine-learning model.

In some embodiment, the system also comprises a sample data generator or a real world sensor for generating the new training data sample.

In some embodiments, the stop criterion is met if a predefined training time value is reached, or if a predefined number of training cycles has been performed, or if a predefined number of new training data samples have been processed, or if a predefined summary prediction quality criterion is met, or if in a predefined time no additional new training data sample with a prediction quality value below the predefined quality value has been determined.

In some embodiments, the system also comprises, upon determining that the prediction quality value of a new non-annotated training data sample is below the predefined quality value, triggering reconfirm means for reconfirming the related prediction label by applying a self-supervised learning system to the new training data sample for increasing a combined confidence level value for the label which prediction quality value is below the predefined quality value.

In some embodiments, the self-supervised learning system comprises at least one ability selected out of the group comprising: rotating the received new training data sample by a predefined angle and predict the rotation angle, flipping the received new training data sample by a predefined angle and predict the rotation angle, re-colorizing the received new training data sample and predict the class of the new, re-colorized data sample, and puzzling the received new training data sample and predict the original position of a tile.

In some embodiments, the trigger means are adapted to be activated only if the extended training data set has been grown by a predefined number or a predefined percentage of new training data samples.

In some embodiments, the machine-learning model is using a deep machine-learning system.

In some embodiments, the system also comprises alarm means for triggering an alarm event if it is determining that a prediction quality of received data sample cannot be improved.

In some embodiments, in the case where two substantially equivalent real world sensors are used having a distance to each other and generating related data samples under different angles from a real world object, the system further uses the related data samples for adapting the machine-learning model in a way that for both related data samples identical prediction results and identical prediction quality values are generated.

Some embodiments of the present invention provide a computer program product for an iterative training of a machine-learning model, the computer program product comprising a computer readable storage medium having program instructions embodied therewith, the program instructions being executable by one or more computing systems or controllers to cause the one or more computing systems to: train a machine-learning model using an initial set of training data samples, receive a new training data sample, predict a label for the new training data sample, upon determining that a prediction quality value for the label prediction of the new training data sample is below a predefined quality value, extend the initial set, thereby building an extended training data set, and repeat the training with the extended training data set, the receiving, the predicting, and the extending until a stop criterion is met, thereby iteratively train the machine-learning model.

What is claimed is:

1. A computer-implemented method comprising:
   training a machine-learning model using an initial set of training data samples;
   receiving a new training data sample;
   predicting a label for the new training data sample;
   upon determining that a prediction quality value for the predicted label of the new training data sample is below a predefined quality value, executing the actions comprising:
      adding the new training data sample to the initial set, thereby building an extended training data set;
      reconfirming the predicted label of the new training data sample by applying a self-supervised learning method to the new training data sample; and
      retraining the machine-learning model using the extended training data set; and
   upon determining that the prediction quality value for the predicted label of the new training data sample cannot be improved, triggering an alarm event.

2. The computer-implemented method of claim 1, further comprising:
   iteratively repeating the receiving, the predicting, the adding, and the retraining until a stop condition is met.

3. The computer-implemented method of claim 2, wherein the stop condition is met when a predefined training time value is reached.

4. The computer-implemented method of claim 2, wherein the stop condition is met when a predefined number of training cycles has been performed.

5. The computer-implemented method of claim 2, wherein the stop condition is met when a predefined number of new training data samples have been processed.

6. The computer-implemented method of claim 2, wherein the stop condition is met when a predefined summary prediction quality condition is met.

7. The computer-implemented method of claim 2, wherein the stop condition is met when, in a predefined time, no additional new training data sample with a prediction quality value below the predefined quality value is determined.

8. The computer-implemented method of claim 1, wherein the self-supervised learning method includes at least one method selected from the group consisting of:
   rotating the new training data sample by a predefined rotation angle and predicting the rotation angle;
   flipping the new training data sample by a predefined flipping angle and predicting the flipping angle;
   re-colorizing the new training data sample and predicting a class of the resulting re-colorized training data sample; and
   puzzling the new training data sample and predicting an original position of a tile of the new training data sample.

9. A computer program product comprising one or more computer readable storage media and program instructions collectively stored on the one or more computer readable storage media, the stored program instructions comprising:
   program instructions to train a machine-learning model using an initial set of training data samples;
   program instructions to receive a new training data sample;
   program instructions to predict a label for the new training data sample;
   program instructions to, upon determining that a prediction quality value for the predicted label of the new training data sample is below a predefined quality value, executing the actions comprising:
      program instructions to add the new training data sample to the initial set, thereby building an extended training data set;
      program instructions to reconfirm the predicted label of the new training data sample by applying a self-supervised learning method to the new training data sample; and
      program instructions to retrain the machine-learning model using the extended training data set; and
      program instructions to, upon determining that the prediction quality value for the predicted label of the new training data sample cannot be improved, trigger an alarm event.

10. The computer program product of claim 9, the stored program instructions further comprising:
   program instructions to iteratively repeat the receiving, the predicting, the adding, and the retraining until a stop condition is met.

11. The computer program product of claim 9, wherein the self-supervised learning method includes at least one method selected from the group consisting of:
   rotating the new training data sample by a predefined rotation angle and predicting the rotation angle;
   flipping the new training data sample by a predefined flipping angle and predicting the flipping angle;
   re-colorizing the new training data sample and predicting a class of the resulting re-colorized training data sample; and
   puzzling the new training data sample and predicting an original position of a tile of the new training data sample.

12. A computer system comprising:
   a processor(s) set; and
   a computer readable storage medium;
   wherein:
   the processor(s) set is structured, located, connected and/or programmed to run program instructions stored on the computer readable storage medium; and
   the stored program instructions comprise:
      program instructions to train a machine-learning model using an initial set of training data samples;
      program instructions to receive a new training data sample;
      program instructions to predict a label for the new training data sample;
      program instructions to, upon determining that a prediction quality value for the predicted label of the new training data sample is below a predefined quality value, executing the actions comprising:
         program instructions to add the new training data sample to the initial set, thereby building an extended training data set;
         program instructions to reconfirm the predicted label of the new training data sample by applying a self-supervised learning method to the new training data sample; and
         program instructions to retrain the machine-learning model using the extended training data set; and
      program instructions to, upon determining that the prediction quality value for the predicted label of the new training data sample cannot be improved, trigger an alarm event.

13. The computer system of claim 12, the stored program instructions further comprising:
   program instructions to iteratively repeat the receiving, the predicting, the adding, and the retraining until a stop condition is met.

14. The computer system of claim 12, wherein the self-supervised learning method includes at least one method selected from the group consisting of:
   rotating the new training data sample by a predefined rotation angle and predicting the rotation angle;
   flipping the new training data sample by a predefined flipping angle and predicting the flipping angle;
   re-colorizing the new training data sample and predicting a class of the resulting re-colorized training data sample; and
   puzzling the new training data sample and predicting an original position of a tile of the new training data sample.

* * * * *